US010190710B2

(12) United States Patent
Butler et al.

(10) Patent No.: US 10,190,710 B2
(45) Date of Patent: Jan. 29, 2019

(54) FOLDABLE DRAIN PIPE FOR A DECANTER IN A WATER TREATMENT SYSTEM

(71) Applicant: ClearCove Systems, Inc., Victor, NY (US)

(72) Inventors: Michael A. Butler, Webster, NY (US); Alfred Bertoni, Fairport, NY (US); Jonathan M. Jacobs, Rochester, NY (US)

(73) Assignee: ClearCove Systems, Inc., Victor, NY (US)

( * ) Notice: Subject to any disclaimer, the term of this patent is extended or adjusted under 35 U.S.C. 154(b) by 247 days.

(21) Appl. No.: 14/961,946

(22) Filed: Dec. 8, 2015

(65) Prior Publication Data

US 2016/0161037 A1    Jun. 9, 2016

Related U.S. Application Data

(63) Continuation-in-part of application No. 14/142,197, filed on Dec. 27, 2013, now Pat. No. 9,855,518.

(51) Int. Cl.
*F16L 27/08* (2006.01)
*C02F 1/00* (2006.01)
(Continued)

(52) U.S. Cl.
CPC ...... *F16L 27/0861* (2013.01); *B01D 21/0006* (2013.01); *B01D 21/0012* (2013.01);
(Continued)

(58) Field of Classification Search
CPC ............ F16L 27/0861; B01D 21/0006; B01D 21/0012; B01D 21/24; B01D 21/2427; B01D 21/2444; B01D 21/34
See application file for complete search history.

(56) References Cited

U.S. PATENT DOCUMENTS 2,401,745 A    6/1946  Brown
2,799,396 A    7/1957  Belaskas
(Continued)

FOREIGN PATENT DOCUMENTS

EP    0010395 A1    4/1980
EP    0421265 A1    4/1991
(Continued)

OTHER PUBLICATIONS

Parker, Rotary Seal Design Guide, Mar. 11, 2010, p. 15-16 (Year: 2010).*

(Continued)

*Primary Examiner* — Bobby Ramdhanie
*Assistant Examiner* — Donovan Bui-Huynh
(74) *Attorney, Agent, or Firm* — Harris Beach PLLC; Neal L. Slifkin

(57) ABSTRACT

A foldable drain pipe for draining effluent from a decanter in a settling tank in a water treatment system, comprising a plurality of pipe sections sealingly connected together end to end by pivotable elbow coupling pairs to form an articulated drain foldable in a vertical direction. The drain pipe is attachable at an upper end to the decanter and at a lower end to a tank outlet in the tank wall. The drain pipe can support its own weight and cannot come into contact undesirably with any other portion of the tank wall. The pipe unfolds upward as needed when the decanter and effluent level are high, and folds compactly between the decanter and the tank outlet when the decanter and effluent level are low. Multiple hobble apparatus options may be selected as defined herein to prevent rotational hyperextension of any of the elbow coupling pairs to assure that the pipe folds correctly.

7 Claims, 5 Drawing Sheets

(51) Int. Cl.
*F16L 43/00* (2006.01)
*B01D 21/24* (2006.01)
*B01D 21/00* (2006.01)
*B01D 21/34* (2006.01)

(52) U.S. Cl.
CPC ......... *B01D 21/24* (2013.01); *B01D 21/2427* (2013.01); *B01D 21/2444* (2013.01); *B01D 21/34* (2013.01); *F16L 43/00* (2013.01); *C02F 2001/007* (2013.01)

(56) References Cited

U.S. PATENT DOCUMENTS

| | | | |
|---|---|---|---|
| 3,006,474 A | | 10/1961 | Elliott |
| 3,372,715 A | | 10/1963 | Ashton |
| 3,717,257 A | | 2/1973 | Boyle |
| 3,957,655 A | | 5/1976 | Barefoot |
| 3,964,512 A | | 6/1976 | Dumas |
| 3,997,198 A | | 12/1976 | Linder |
| 4,009,106 A | | 2/1977 | Smith |
| 4,192,746 A | | 3/1980 | Arvanitakis |
| 4,202,372 A | * | 5/1980 | Gibbons ................ B67D 9/02 137/615 |
| 4,226,714 A | | 10/1980 | Furness |
| 4,367,145 A | | 1/1983 | Simpson |
| 4,405,458 A | | 9/1983 | McHugh, Jr. |
| 4,474,213 A | | 10/1984 | Jameson |
| 4,608,165 A | | 8/1986 | Galper |
| 4,715,570 A | | 12/1987 | Mashuda |
| 5,205,768 A | | 4/1993 | Pollack |
| 5,290,434 A | | 3/1994 | Richard |
| 5,352,356 A | | 10/1994 | Murphy |
| 5,411,633 A | | 5/1995 | Phillips et al. |
| 5,754,986 A | | 5/1998 | Chien |
| 5,951,878 A | | 9/1999 | Astrom |
| 6,213,555 B1 | | 4/2001 | La Terra |
| 7,025,888 B2 | | 4/2006 | Thompson |
| 7,216,373 B2 | | 5/2007 | Huang |
| 7,972,505 B2 | * | 7/2011 | Wright ............... B01D 21/0006 210/109 |
| 8,225,942 B2 | | 7/2012 | Wright |
| 8,398,864 B2 | | 3/2013 | Wright |
| 8,721,889 B2 | | 5/2014 | Conner et al. |
| 8,875,371 B2 | | 11/2014 | Patten et al. |
| 2003/0164341 A1 | | 9/2003 | Use et al. |
| 2006/0218712 A1 | | 10/2006 | Nichols-Roy et al. |
| 2007/0095749 A1 | | 5/2007 | Komatsu |
| 2007/0151916 A1 | | 7/2007 | Knappe et al. |
| 2008/0296228 A1 | | 12/2008 | Sauvignet et al. |
| 2009/0065957 A1 | | 3/2009 | Mao et al. |
| 2009/0095672 A1 | | 4/2009 | Wilcher et al. |
| 2010/0176054 A1 | | 7/2010 | Koopmans |
| 2010/0236999 A1 | | 9/2010 | Utsunomiya |
| 2011/0042844 A1 | | 2/2011 | Brown et al. |
| 2011/0073296 A1 | | 3/2011 | Richard et al. |
| 2011/0278212 A1 | * | 11/2011 | Tyner ................ B01D 21/2422 210/170.09 |
| 2012/0261337 A1 | | 10/2012 | Weiss |

FOREIGN PATENT DOCUMENTS

| | | |
|---|---|---|
| EP | 1700963 A1 | 9/2006 |
| EP | 2889067 A1 | 7/2015 |
| GB | 1079809 A | 8/1967 |
| JP | H03 65298 A | 3/1991 |
| JP | 2002001310 A | 1/2002 |
| WO | 2011087936 A2 | 7/2011 |

OTHER PUBLICATIONS

Freedonia, Water & Wastewater Pipe, Feb. 2012. p. 4 (Year: 2012).*
Communication: Extended EP Search Report for EP 14200235, dated Jan. 3, 2016, 17 Pages.
Communication: Partial EP Search Report for EP 15175703, dated Jul. 1, 2016, 10 Pages.
"Vortex Grit Chamber KD 01.5", Dec. 17, 2013 (Dec. 17, 2013), X P055236807 Retrieved from the Internet: URL: http://www.dwe.dk/files/files/produkter/KD01-5_bro_GB.pdf [retrieved on Dec. 16, 2015] p. 2; figure 1, 2.
Dango & Dienenthal Plate Filter Brochure, 2011, 6 Pages.

* cited by examiner

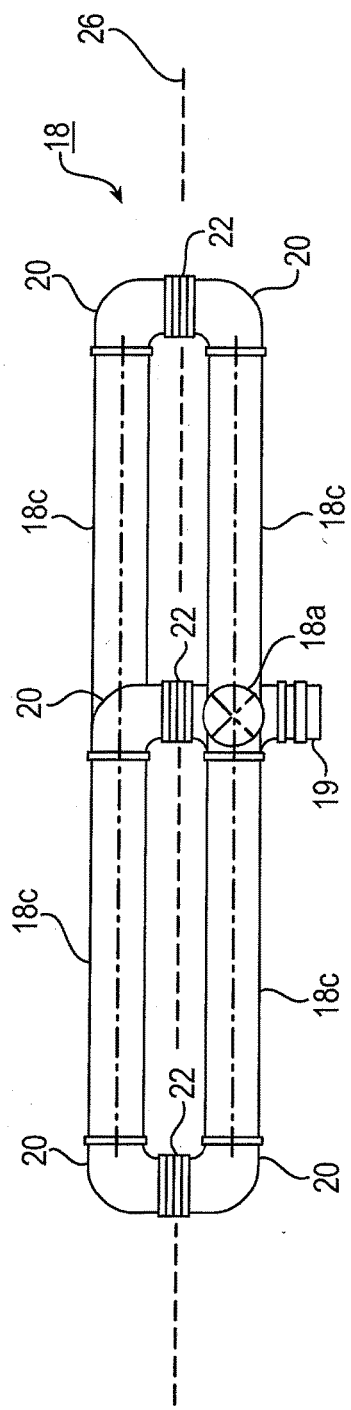
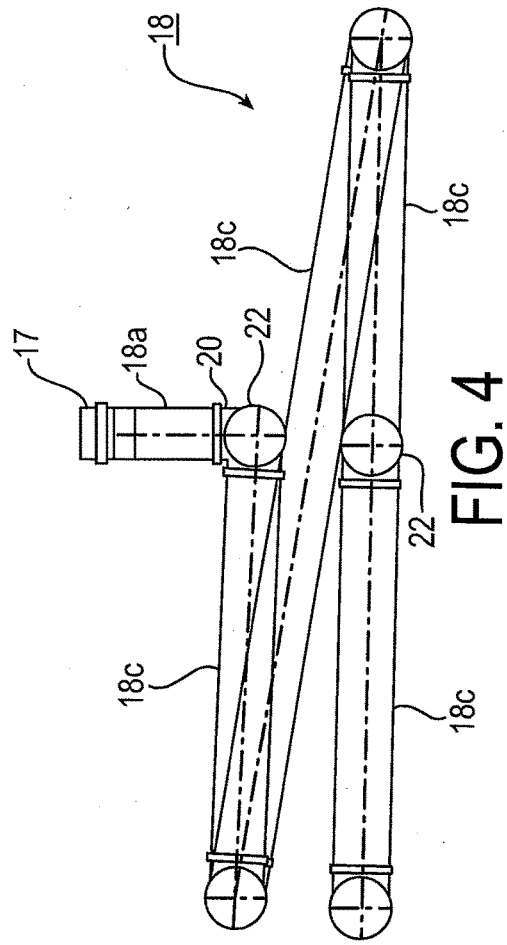
FIG. 3
FIG. 4

FOLDABLE DRAIN PIPE FOR A DECANTER IN A WATER TREATMENT SYSTEM

FIELD OF THE INVENTION

The present invention relates generally to the field of settling tanks in water treatment systems wherein grit and dense solids are allowed to settle from the influent, and buoyant solids (fats, oil, grease, non-dense solids) are prevented from entering into an effluent decanter. As used herein, "decanter" should be taken to mean a screen/filter box assembly, also known as an SBX, or a floating weir-like assembly, also known as a DBX, or a hybrid combination of both in a single structure. More particularly, the present invention relates to an effluent decanter in the form of a vertically driven or floating box assembly (BX) for separating solids from liquids; and most particularly, to a foldable drain pipe (FDP) for draining effluent from a decanter in a settling tank in a water treatment system, the FDP comprising a plurality of pipe sections sealingly and pivotably connected together end to end by elbow coupling pairs and rotary seals to form an articulated drain. The FDP is attachable at an upper end to the decanter and at a lower end to a tank outlet which passes through the tank wall; and is foldable therebetween. A hobble apparatus is attached to the pipe, sections to prevent rotational hyperextension of any of the elbow coupling pairs to assure that the pipe always folds correctly.

BACKGROUND OF THE INVENTION

In developed and developing countries, primary treatment and disinfection of waste water discharges from collection systems and waste water treatment facilities is the first step to improving water quality. As the countries continue to advance, secondary and tertiary waste water treatment processes are added to provide additional treatment of the primary effluent.

Primary treatment removes large solids via screening and gravitational settling to remove light and dense solids, allowing neutrally buoyant matter to pass into the secondary treatment process or receiving body of water. Primary treatment utilizing gravitational settling or clarification is recognized as removing 20-33% of the organic load as measured in Biochemical Oxygen Demand (BOD). Secondary treatment removes another 50+% of the organic load by converting the BOD to biomass (bacteria) and $CO_2$.

Secondary treatment provides an environment of adequate temperature, volume, mixing, and oxygen or the absence of oxygen in anaerobic processes to sustain the bacterial population necessary to consume the BOD and nutrients remaining in the waste water after primary treatment. New organic matter enters the treatment facility continuously so a portion of the existing bacterial population is removed from the process to promote the growth of new bacteria. The effectiveness of primary treatment directly affects the secondary process or the receiving body of water as discharged from the collection system.

In the parent application (U.S. Ser. No. 14/142,197) of the present invention, the effluent decanter is a screen decanter assembly in the form of a rectangular box (SBX) controllably driven in the vertical direction to optimize the exposure of the screen to the wastewater to varying wastewater levels. The SBX can be lifted from the wastewater for backflushing and sterilization in a dedicated overhead apparatus. Because the motion of the effluent decanter is only vertical, the required footprint within the tank can be relatively small. A waste water treatment facility may comprise a ganged plurality of such vertically-driven effluent decanters for wastewater systems having high flows, limited surface area, and/or shallow active tank volumes. A tank for accommodating such a plurality typically has a V-shaped cross-section.

In the prior art, to avoid disturbing and re-suspending the settled organics, the effluent is brought out of the decanter by a hose connecting the bottom of the decanter to an outlet in the wall of the tank. The hose has several requirements that must be met for proper operation of the system.

First, it must maintain a solid connection with both the decanter and the tank wall as the water level and thus the decanter elevation changes through the operating cycle.

Second, it must fold into a compact space as the decanter reaches the bottom of its travel. For municipal water treatment plants, this space can often take the form of a "V" shaped trough which typically accommodates several decanters along its length.

Third, it must not contact the sides of the tank because this would both disturb the settled BOD sludge and potentially. damage the hose.

Fourth, the hose must be strong enough to support its own weight, even when suspended above the water surface and filled with water as can occur during maintenance or cleaning.

Fifth, the hose and connections must be highly reliable and possess long service and maintenance intervals because the nature of waste treatment is nearly 24/7 continuous operation for several years duration.

Sixth, the hose must have a constant volume at all hose positions and must remain substantially full of water or screened effluent at all times to prevent an uncontrolled inrush of fresh effluent into the decanter when the tank is refilled. Such an inrush risks immediate plugging of the decanter screens by solid materials which otherwise would float and be skimmed off or would settle before reaching the decanter.

In practice it is difficult for a flexible hose or rigid pipe or other alternative means to meet all of these requirements: a conventional prior art flexible hose, as disclosed in incorporated U.S. application Ser. No. 14/142,197, can contact the tank wall and may not be sufficiently strong to support its weight when filled with fluid; a telescoping pipe does not enable sufficient vertical range of travel of an SBX; and a tilting pipe, also as disclosed in U.S. application Ser. No. 14/142,197, requires the length of its tilt arm to pivot along the tank's horizontal axis and thus would reduce the possible number of decanters.

It is a principal object of the invention to provide a versatile and compact mechanism for meeting the above requirements while draining a vertically-driven or floating decanter over a wide range of influent and effluent flow rates.

BRIEF DESCRIPTION OF THE INVENTION

Briefly described, the present invention provides an articulated (foldable) drain pipe (FDP) that can accommodate a full range of operational fluid levels in a waste water settling tank evacuated by a decanter. If the decanter employs a screen (e.g. an SBX), it may take the form of a rectangular screen box or screen cylinder that can float to track the tank's water level or be controllably driven in the vertical direction to expose the screen to varying wastewater levels and to lift the decanter from the wastewater for backflushing, sterilization, or maintenance in a dedicated overhead apparatus. If the decanter employs a weir-like assembly (e.g. a DBX), the decanter must also be controllably driven in the vertical direction to maintain the weir at the proper elevation for decanting and to lift the decanter from the wastewater for cleaning. A foldable drain pipe in accordance with the present invention can variably fold and unfold under the decanter to accommodate all vertical operational positions of the decanter.

An FDP for draining effluent from the decanter in accordance with the present invention comprises a plurality of pipe sections sealingly and rotatably connected together end to end by elbow coupling pairs and rotary seals to form an articulated drain pipe that can varyingly fold to accommodate changes in the vertical position of the decanter. One of multiple hobble apparatus options attached to various of the pipe sections prevents rotational hyperextension of any of the elbow coupling pairs beyond 180° to assure that the pipe always re-folds correctly, as desired.

DESCRIPTION OF THE DRAWINGS

The foregoing and other objects, features, and advantages of the invention, as well as a presently preferred embodiment thereof, will become more apparent from a reading of the following description in connection with the accompanying drawings in which:

FIG. 3 is a plan view of the foldable drain pipe shown in FIGS. 1 and 2;

FIG. 4 is an offset cross-sectional elevational view of the foldable drain pipe shown in Position C in FIG. 2;

DETAILED DESCRIPTION OF THE INVENTION

Figure 1:
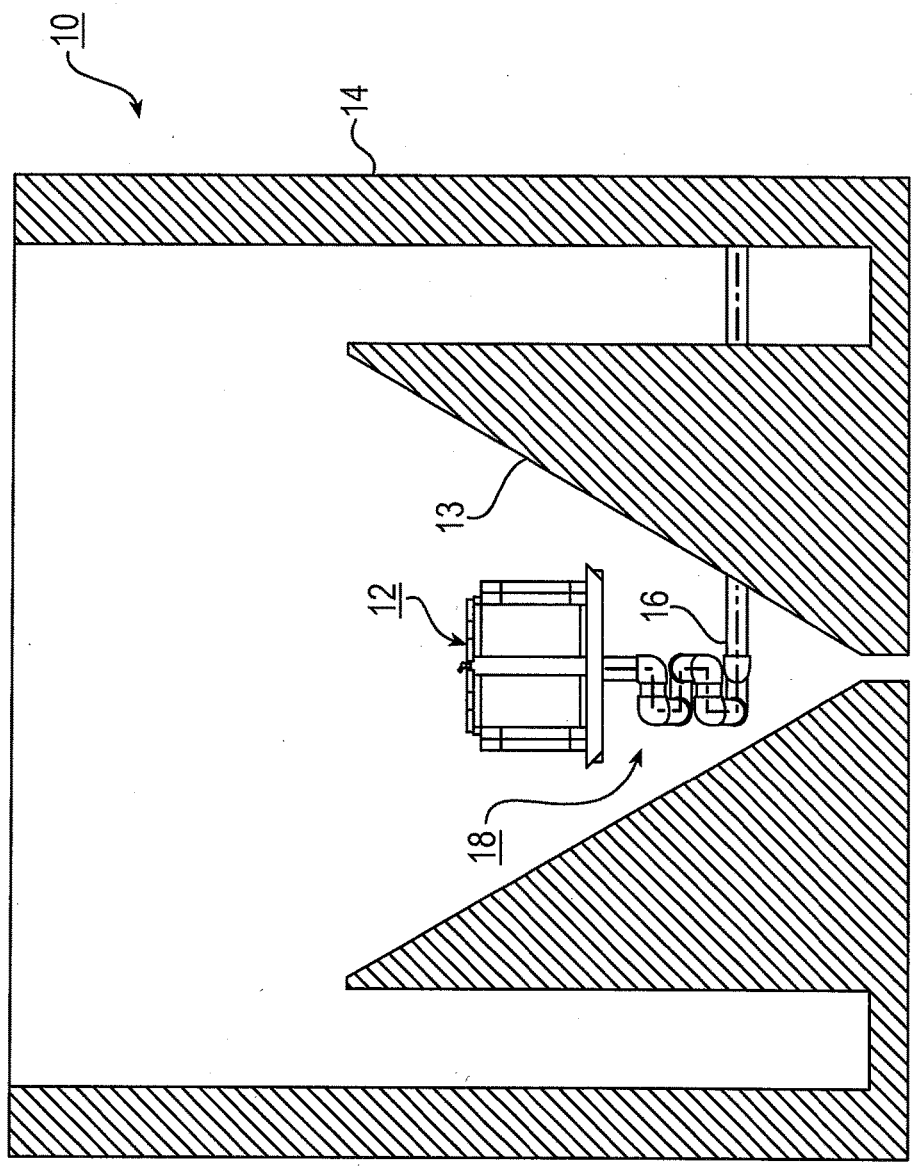
FIG. 1 is a cross-sectional elevational view of a settling tank equipped with a decanter and a folding drain pipe in accordance with the present invention.

Referring to FIG. 1, there is shown a decanter system 10 in accordance with the present invention, comprising a first embodiment of a decanter 12, a settling tank 14 having a tank outlet 16, and a foldable drain pipe (FDP) 18 connected therebetween. Preferably, tank outlet 16, extending through the wall of tank 14, is directly below the vertical operational path of the decanter such that FDP 18 folds and unfolds beneath decanter 12 and above tank outlet 16.

Figure 2:
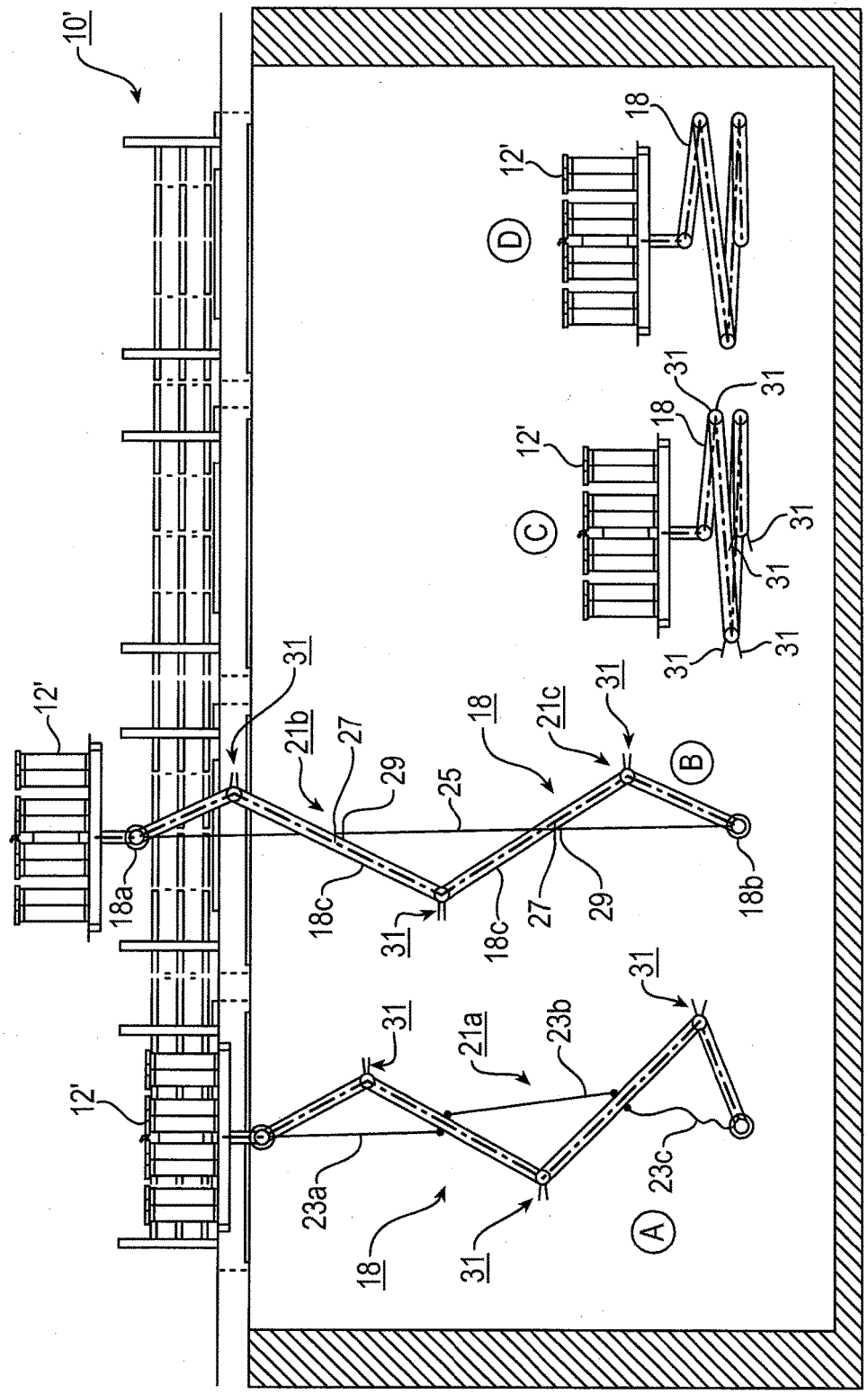
FIG. 2 is a schematic drawing of a settling tank showing a decanter and a foldable drain pipe in four different operating positions, also showing first, second, and third exemplary embodiments of hobble apparatus to prevent rotational hyperextension of the elbow coupling pairs.
Figure 5:
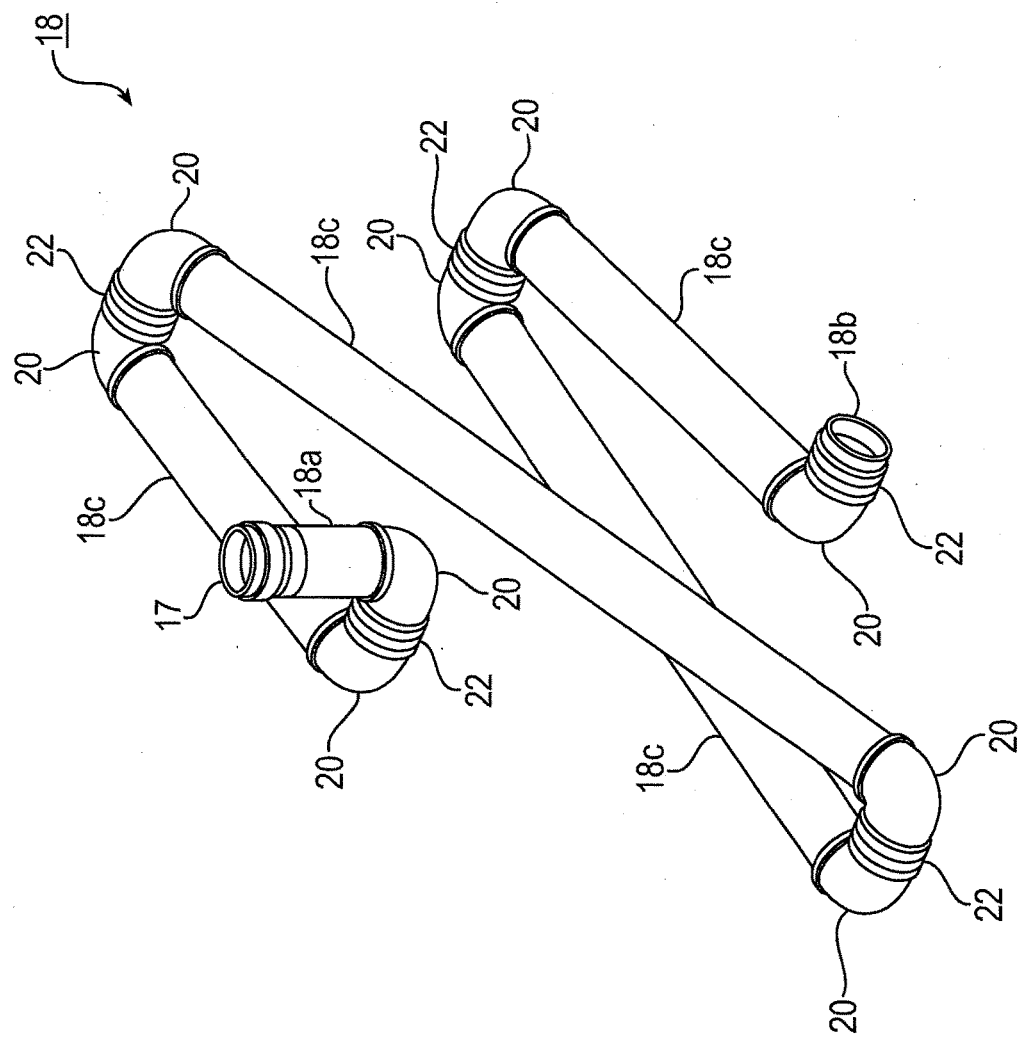
FIG. 5 is an isometric view from above of a foldable drain pipe in accordance with the present invention.
Figure 6:
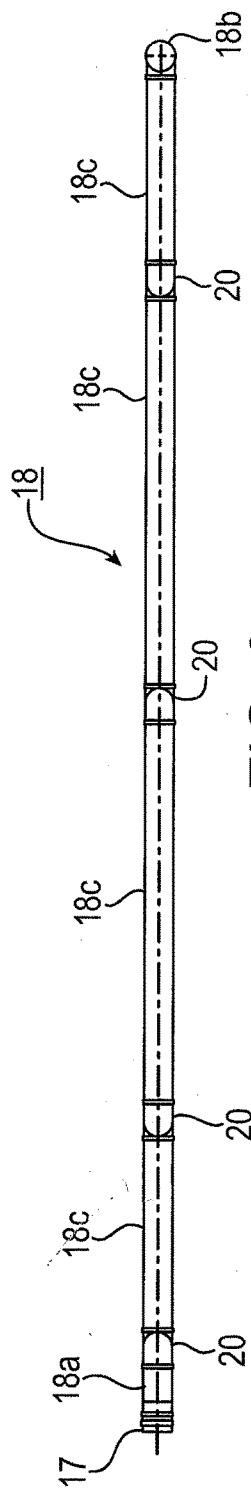
FIG. 6 is a side view of the foldable drain pipe shown in FIG. 5, fully extended without hobble apparatus constraint, as fabricated and stand-alone prior to being integrated into the system.

Referring to FIG. 2, in a schematic decanter system 10', an embodiment of a vertical lift decanter 12' and associated FDP 18 are shown in four separate positions: A) flushing and cleaning of the decanter above the tank with FDP 18 partially unfolded; B) maintenance of the decanter above the tank with FDP 18 fully unfolded but hobbled; C) tank empty with the decanter fully lowered and FDP 18 fully folded; and D) the decanter in an intermediate operating position with FDP 18 partially unfolded. It will be seen that in all possible positions of the decanter, the FDP folds and unfolds directly below the decanter in a prescribed fashion and therefore cannot undesirably make contact with a wall of the tank, even when the tank has a V-shaped sludge hopper bottom 13 as shown in FIG. 1. Referring to FIGS. 2 through 7, construction of an exemplary FDP 18 in accordance with the present invention is shown in detail.

FDP 18 comprises a plurality of articulated sections of rigid pipe connected end to end. A first pipe 18a is articulated at only one end and is modified at the other end 17 to be fixedly attached to decanter 12,12' as shown in FIGS. 1 and 2. A last pipe 18b is articulated at only one end and is modified at the other end 19 to be rotatably attached to tank outlet 16 as shown in FIGS. 1 and 2. Each of the intermediate pipes 18c disposed between first and last pipes 18a,18b is articulated at both ends. Articulation is provided by an elbow 20 on each of the articulated adjacent pipe ends, defining an elbow coupling pair, and a rotary seal 22 disposed between adjacent elbows 20, the assembly defining an articulated coupling.

An FDP in accordance with the present invention may be formed of any convenient material selected from the group consisting of metal and plastic polymer, preferably a plastic polymer comprising PVC.

It will be seen that an FDP in accordance with the present invention, formed of pipe and elbow elements of constant length and cross-sectional area, has a constant volume over the complete range of positions of folding, from completely folded to completely extended. Thus, once filled, FDP 18 will always remain full of liquid at any of positions A-D in FIG. 2 unless or until purposely drained by opening the tank outlet control valve. Even when decanter 12' is in position B with the FDP. extended and the tank empty, FDP 18 is sufficiently strong to support its filled weight without rupture. This feature is an important performance attribute of an FDP in accordance with the present invention and a distinction over prior art soft drain hoses which can collapse and thus have a reduced volume under some operating conditions.

Figure 7:
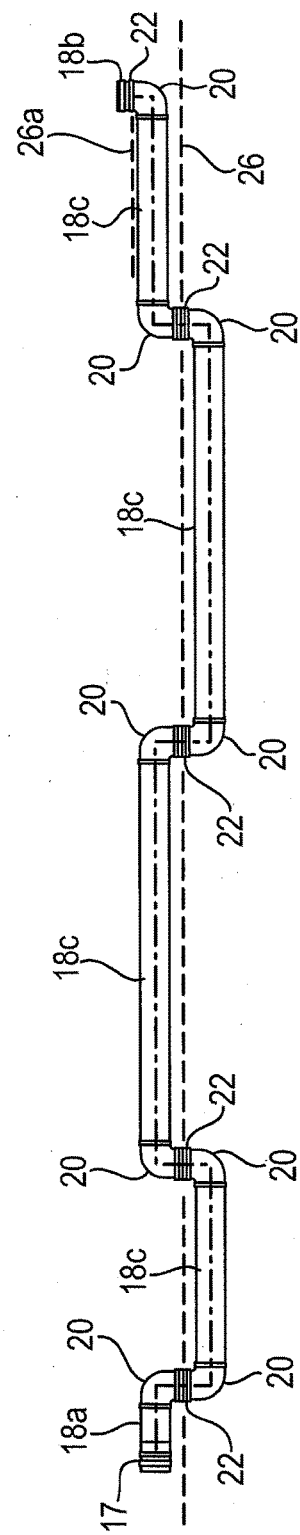
FIG. 7 is a top view of the fully extended foldable drain pipe shown in FIG. 6, fully extended without hobble apparatus constraint, as fabricated and stand-alone prior to being integrated into the system.

It will be seen further that, because each articulated coupling is limited to rotation in a common plane 26, as shown in FIG. 7 (except for the coupling formed at last pipe 18b which rotates in a parallel plane 26'), FDP 18 cannot drift sideways during its travel and therefore cannot make contact with a wall of tank 14 or with any adjacent decanter systems in a multiple-decanter installation.

Referring again to FIG. 2, to assure that FDP 18 always refolds into Position C, it is necessary to constrain the maximum angle of unfolding of the elbow pairs to less than 180°, thus preventing hyperextension of any of the elbow pairs. This may be accomplished by inclusion of any appropriate hobble apparatus 21. Three exemplary hobble schemes 21a, 21b, 21c are shown in FIG. 2, although other schemes should be considered as being within the scope of the present invention.

In Position 18A, Scheme A comprises discrete lengths of hobbling cable 23a,23b,23c attached between the pipe sections and/or elbows as shown.

In Position 18B, Scheme B comprises a single cable 25 extending from pipe 18a to pipe 18b, passing through guides 27 attached to intermediate pipes 18c. Snubbers 29 attached to cable 25 engage guides 27 to limit the opening of the elbow pair angles as shown.

In Position 18C, the three intermediate elbow pairs are each provided with a pair of interfering stops 31 extending across plane of rotation 26 (FIGS. 3 and 7). Stop pairs 31 are shown in operation in FIG. 2, Positions A, B, and C. As elbow pairs rotate in plane 26, stop pairs 31 eventually engage each other (e.g., Position B) limiting further unfolding of the elbow pairs.

From the foregoing description, it will be apparent that there has been provided an improved decanter system comprising an improved decanter drain apparatus for a wastewater clarifier. Variations and modifications of the herein described decanter system, in accordance with the invention, will undoubtedly suggest themselves to those skilled in this art. Accordingly, the foregoing description should be taken as illustrative and not in a limiting sense.

What is claimed is:

1. A decanter system for separating liquid from solids in an influent mixture in a tank, comprising:
   a) a decanter at least partially submersible in said influent mixture in said tank;
   b) a tank outlet for said tank formed in a wall thereof;
   c) a foldable drain pipe comprising a plurality of articulated sections of rigid pipe, connected rotatably end to end, and disposed between and connected to said decanter and said tank outlet, for draining separated liquid from said decanter, further comprising an apparatus for limiting unfolded extension of said foldable drain pipe to a predetermined extent, said apparatus including at least one non-rigid hobbling cable disposed between each adjacent of said articulated sections of rigid pipe;
   d) wherein said plurality of articulated sections of rigid pipe comprises:
      (i) a first pipe that is articulated at only one end and is modified at the other end to be attached to said decanter,
      (ii) a last pipe that is articulated at only one end and is modified at the other end to be attached to said tank outlet, and
      (iii) at least one intermediate pipe disposed between said first and last pipe that is articulated at both ends; and
   e) wherein the influent mixture flows through the decanter to generate a separated out liquid from solids.

2. A decanter system in accordance with claim 1 wherein said tank is a settling tank.

3. A decanter system in accordance with claim 1 wherein each of said articulated sections of rigid pipe ends includes an elbow.

4. A decanter system in accordance with claim 3 wherein the elbows of the adjacent articulated sections of rigid pipes define an elbow coupling pair joined by a rotary seal.

5. A decanter system in accordance with claim 1 wherein said foldable drain pipe is formed of material selected from the group consisting of metal and plastic polymer.

6. A decanter system in accordance with claim 1 wherein the volume of said foldable drain pipe is constant over a range of positions of folding.

7. A decanter system in accordance with claim 1 wherein said foldable drain pipe is maintained substantially full of said separated liquid under all operating conditions of said decanter system except during intentional draining of said decanter and said foldable drain pipe.

* * * * *